US012595916B2

(12) United States Patent
Jeong et al.

(10) Patent No.: US 12,595,916 B2
(45) Date of Patent: Apr. 7, 2026

(54) COOKING APPARATUS

(71) Applicant: SAMSUNG ELECTRONICS CO., LTD., Suwon-si (KR)

(72) Inventors: Jiho Jeong, Suwon-si (KR); Inki Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 855 days.

(21) Appl. No.: 17/874,740

(22) Filed: Jul. 27, 2022

(65) Prior Publication Data

US 2023/0095490 A1 Mar. 30, 2023

Related U.S. Application Data

(63) Continuation of application No. PCT/KR2022/010111, filed on Jul. 12, 2022.

(30) Foreign Application Priority Data

Sep. 30, 2021 (KR) ........................ 10-2021-0129808
Nov. 25, 2021 (KR) ........................ 10-2021-0164090

(51) Int. Cl.
*H05B 6/64* (2006.01)
*F24C 7/02* (2006.01)
*F24C 7/06* (2006.01)

(52) U.S. Cl.
CPC ................ *F24C 7/067* (2013.01); *F24C 7/02* (2013.01); *H05B 6/6411* (2013.01); *H05B 6/6482* (2013.01)

(58) Field of Classification Search
CPC .... F24C 7/067; F24C 7/02; F24C 7/06; F24C 7/08; F24C 11/00; F24C 15/16;
(Continued)

(56) References Cited

U.S. PATENT DOCUMENTS 6,028,298 A 2/2000 Yang
6,730,895 B2 5/2004 Kim
(Continued)

FOREIGN PATENT DOCUMENTS

CN 201779719 3/2011
JP 7-269876 10/1995
(Continued)

OTHER PUBLICATIONS

Office Action issued by the European Patent Office on Aug. 5, 2024 for European Patent Application No. 22876639.0.
(Continued)

*Primary Examiner* — Tiffany T Tran
(74) *Attorney, Agent, or Firm* — STAAS & HALSEY LLP

(57) ABSTRACT

A cooking apparatus includes an outer housing, an inner housing forming a cooking chamber, a plurality of heaters arranged on an upper side of the cooking chamber, a tray including a plurality of cooking surfaces heated at different temperatures by the plurality of heaters, the tray being arranged to be detachable from the cooking chamber, a turn table rotatably arranged under the tray, and a magnetron arranged outside the cooking chamber at a lower height than the tray to emit high-frequency waves to an area between the tray and the turn table.

14 Claims, 8 Drawing Sheets

(58) Field of Classification Search
CPC .. H05B 6/6411; H05B 6/6482; H05B 6/6408; A47J 37/06
See application file for complete search history.

(56) References Cited

U.S. PATENT DOCUMENTS

| | | | |
|---|---|---|---|
| 7,005,614 | B2 | 2/2006 | Lee |
| 7,060,943 | B2 | 6/2006 | Hwang |
| 2019/0045590 | A1* | 2/2019 | Kunimoto ............... F24C 7/046 |
| 2019/0053332 | A1 | 2/2019 | Cheng et al. |
| 2019/0239295 | A1* | 8/2019 | Jang ..................... H05B 6/6402 |
| 2019/0394839 | A1* | 12/2019 | Otani ..................... H05B 6/642 |
| 2021/0235554 | A1 | 7/2021 | Jeong et al. |

FOREIGN PATENT DOCUMENTS

| | | |
|---|---|---|
| JP | 2000-82581 | 3/2000 |
| JP | 2003-65542 | 3/2003 |
| JP | 2004-93100 | 3/2004 |
| KR | 96-2813 | 1/1996 |
| KR | 2000-0003991 | 1/2000 |
| KR | 10-2000-0013635 | 3/2000 |
| KR | 10-2004-0017188 | 2/2004 |
| KR | 10-2017-0045461 | 4/2017 |
| KR | 10-2021-0012398 | 2/2021 |
| KR | 10-2021-0095424 | 8/2021 |
| WO | WO 2021/145736 | 7/2021 |

OTHER PUBLICATIONS

International Search Report dated Oct. 27, 2023 in International Patent Application No. PCT/KR2020/010111 (4 pages; 4 pages English translation).

PCT/ISA/237 dated Oct. 27, 2023 in International Patent Application No. PCT/KR2020/010111 (4 pages).

* cited by examiner

COOKING APPARATUS

CROSS-REFERENCE TO RELATED APPLICATION

This application is a continuation application, under 35 USC § 111(a), of International Application No. PCT/KR2022/010111, filed on Jul. 12, 2022, which claims priority to Korean Patent Application Nos. 10-2021-0129808 filed on Sep. 30, 2021 and 10-2021-0164090 filed on Nov. 25, 2021 the disclosures of which are incorporated herein by reference in their entireties.

BACKGROUND

1. Field

The disclosure relates to cooking apparatuses, and more particularly to a cooking apparatus with an improved structure.

2. Discussion of Related Art

Cooking apparatuses are devices for cooking foods by heating, which provide various functions related to cooking, such as heating, thawing, drying, and sterilizing of an object to be cooked. The cooking apparatuses include, for example, ovens such as gas ovens or electric ovens, microwave heating devices (also referred to as microwaves), gas ranges, electric ranges, gas grills or electric grills.

In general, the oven is an apparatus for cooking food by transferring heat directly to the food or heating the inside of the cooking chamber by means of a heating source that produces heat, such as a heater. The microwave is an apparatus for cooking food by frictional heat between molecules, which is produced by using high-frequency waves as a heating source to disturb molecular arrangement of the food.

SUMMARY

The disclosure provides a cooking apparatus with a better position to place a magnetron.

According to an aspect of the disclosure, a cooking apparatus includes an outer housing forming an exterior of the cooking apparatus, an inner housing arranged in an interior of the outer housing and forming a cooking chamber, a plurality of heaters arranged on an upper side of the cooking chamber, a tray including a plurality of cooking surfaces heated at different temperatures by the plurality of heaters, the tray being detachable from and attachable to the cooking chamber, a turn table rotatably arranged under the tray, and a magnetron to emit high-frequency waves to an area between the tray and the turn table, the magnetron arranged on an exterior of the cooking chamber and positioned lower along a latitudinal axis of the cooking apparatus than the tray and the plurality of heaters.

The inner housing may include a side plate forming a side surface of the cooking chamber, the outer housing may include a side wall arranged side by side with an outer side of the side plate, and the magnetron may be arranged in a space between the side plate and the side wall.

The inner housing may include a tray seat formed to protrude toward the cooking chamber and to receive the tray and be seated on the tray seat, and the magnetron is arranged at a position lower along the latitudinal axis of the cooking apparatus than the tray seat.

The tray may include a cooking portion arranged on an upper surface of the tray to face the plurality of heaters, and a heating portion formed on an undersurface of the tray to transfer heat to the cooking portion by absorbing high-frequency waves oscillating from the magnetron.

The magnetron may be provided to heat a first object placed on the tray through the heating portion and heat a second object placed on the turn table.

A distance from the plurality of cooking surfaces of the tray to lower surfaces of the plurality of heaters may be set to about 100 mm or less.

A distance from the undersurface of the tray to an upper surface of the turn table may be set to about 90 mm or more and about 130 mm or less.

The first object may be placed on the tray and a second object is placed on the turn table, so that the first object and the second object are simultaneously cooked by the plurality of heaters and the magnetron, respectively.

Cooking sections in which cooking is conducted by the plurality of heaters at different temperatures may be formed above the tray, and a cooking section in which cooking is conducted by the magnetron may be formed under the tray.

The inner housing may include a first side plate forming a side surface of the cooking chamber, a second side plate opposite the first side plate, and an upper plate arranged on an upper side of the cooking chamber between the first side plate and the second side plate and equipped with the plurality of heaters.

The plurality of heaters may include a first heater, a second heater, a third heater and a fourth heater arranged at predetermined intervals along a first direction from the first side plate to the second side plate.

The plurality of cooking surfaces of tray may include a first cooking surface facing the first heater and the third heater, a second cooking surface facing the second heater, and a third cooking surface facing the fourth heater.

The tray may further include a cooking portion formed on the upper surface of the tray to include the first cooking surface, the second cooking surface, and the third cooking surface divided along the first direction, the cooking portion having a length along the first direction and a length along a second direction perpendicular to the first direction, the length along the first direction being about 1.4 or more and about 2.0 or less times the length along the second direction.

The magnetron may be arranged under the turn table.

The inner housing may include a bottom plate equipped with the turn table, and the cooking apparatus further comprising a turn table driver to rotate the turn table, the turn table driver arranged in a machine room formed between the bottom plate and the outer housing to rotate the turn table.

In accordance with another aspect of the disclosure, a cooking apparatus includes an outer housing, an inner housing forming a cooking chamber, and including a side plate forming a side surface of the cooking chamber and a top plate forming an upper surface of the cooking chamber, a plurality of heaters equipped on the top plate, a tray including a plurality of cooking surfaces heated at different temperatures by the plurality of heaters, and having an upper surface on which a first cooking object is placed, a turn table rotatably arranged under the tray, and on which a second cooking object is placed, and a magnetron arranged between the side plate and the outer housing at a lower height than the tray to emit high-frequency waves toward the second cooking object.

The tray may include a cooking portion arranged to face the plurality of heaters and having the plurality of cooking surfaces, and a heating portion arranged to face the turn table to absorb high-frequency waves emitted from the magnetron.

The heating portion may transfer heat to the cooking portion to heat a lower surface of the first cooking object.

The magnetron may be arranged at a lower height than the heating portion of the tray.

A distance from the plurality of cooking surfaces of the tray to lower surfaces of the plurality of heaters may be set to about 100 mm or less.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
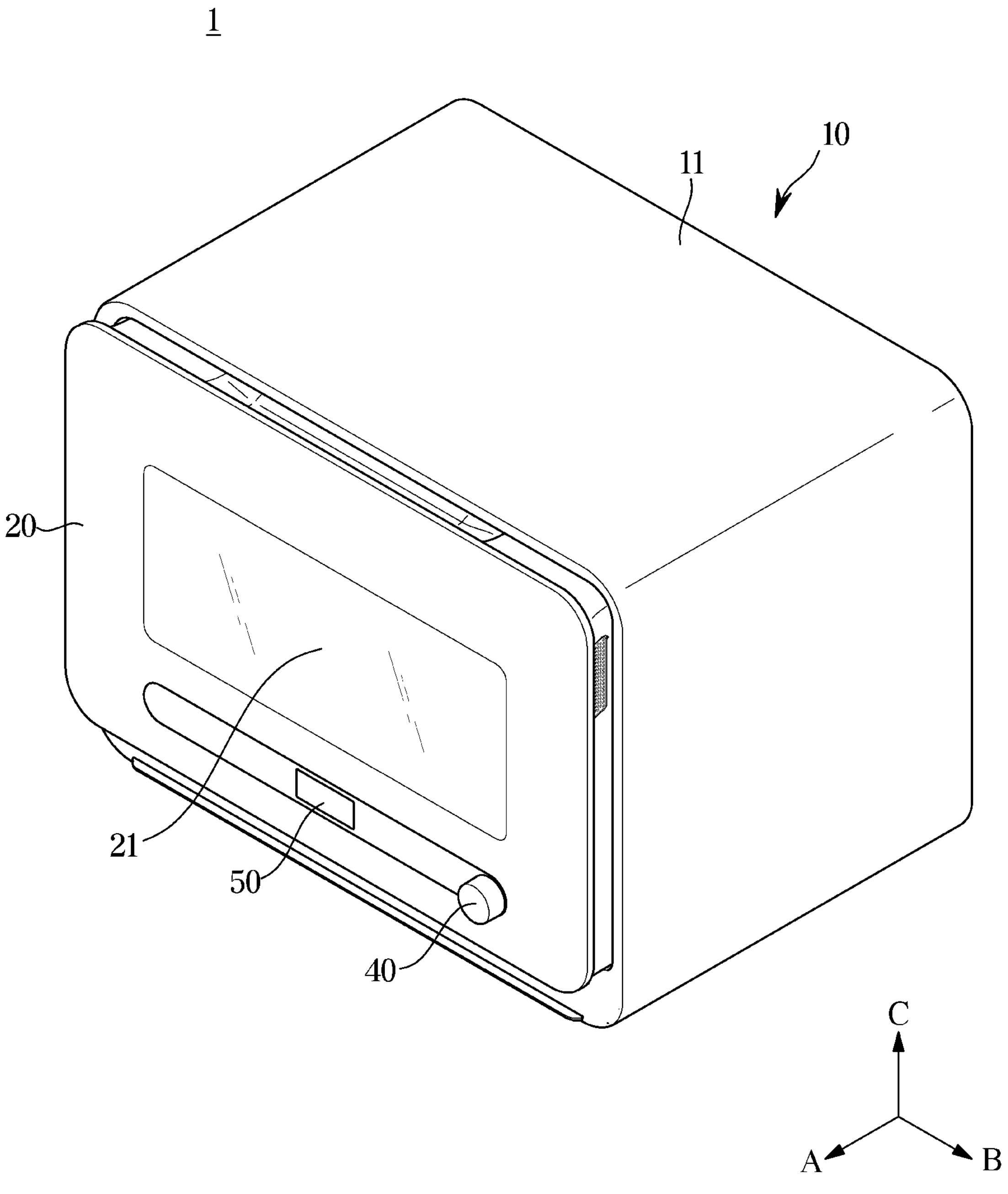
FIG. 1 is a perspective view of a cooking apparatus, according to an embodiment of the disclosure.

Embodiments and features as described and illustrated in the disclosure are merely examples, and there may be various modifications replacing the embodiments and drawings at the time of filing this application.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or room discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The cooking apparatus may be configured to perform both the oven and microwave functions. Specifically, an object to be cooked may be heated in various ways in a cooking chamber with a heater arranged on one side and a magnetron arranged on the other side.

Furthermore, the heater may be provided in the plural. Accordingly, a tray equipped in the cooking chamber may be arranged to include a plurality of cooking surfaces heated at different temperatures by the plurality of heaters. Reference will now be made in detail to embodiments, examples of which are illustrated in the accompanying drawings, wherein like reference numerals refer to the like elements throughout.

Figure 2:
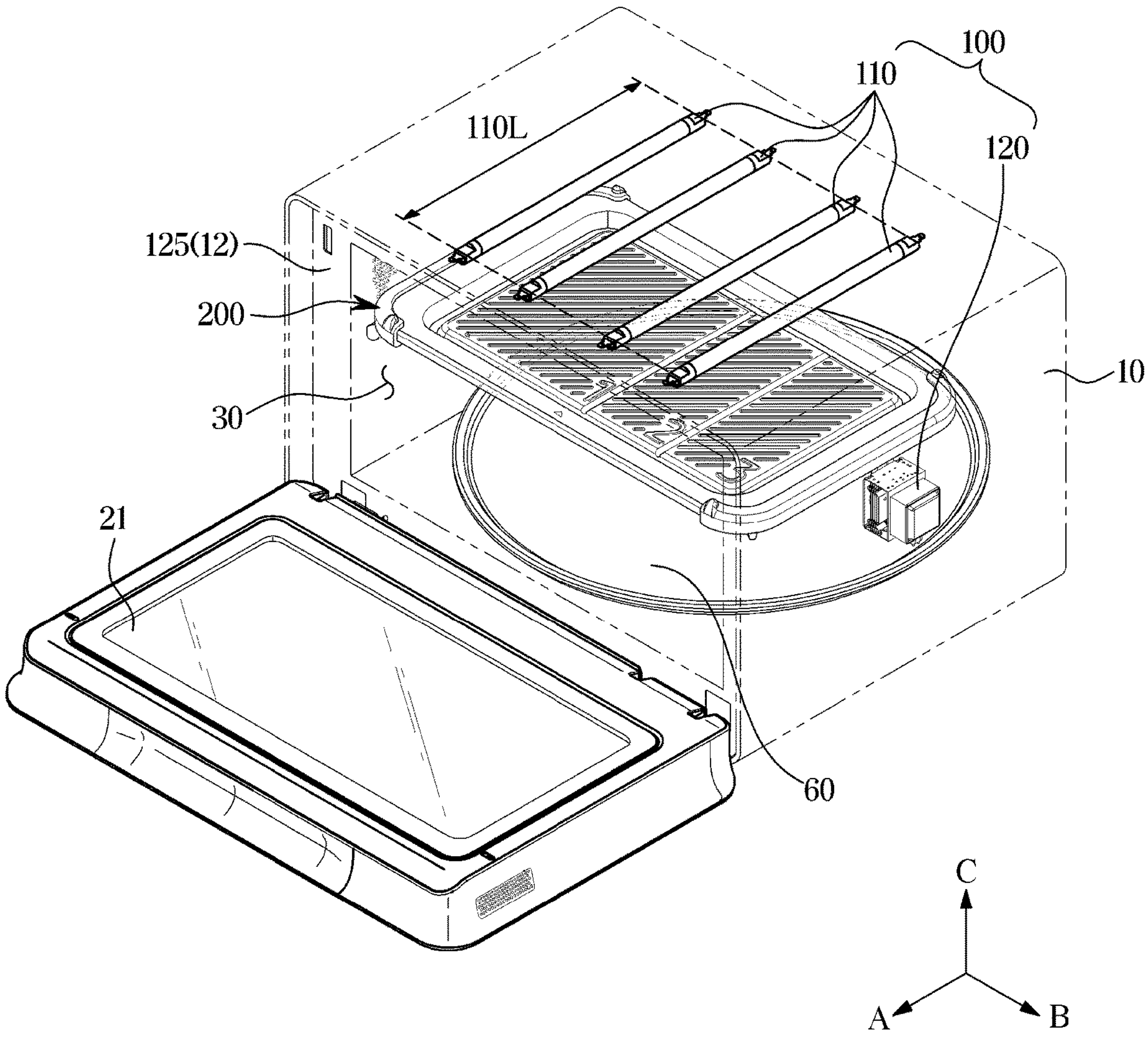
FIG. 2 illustrates several components in a cooking apparatus, according to an embodiment of the disclosure.
Figure 3:
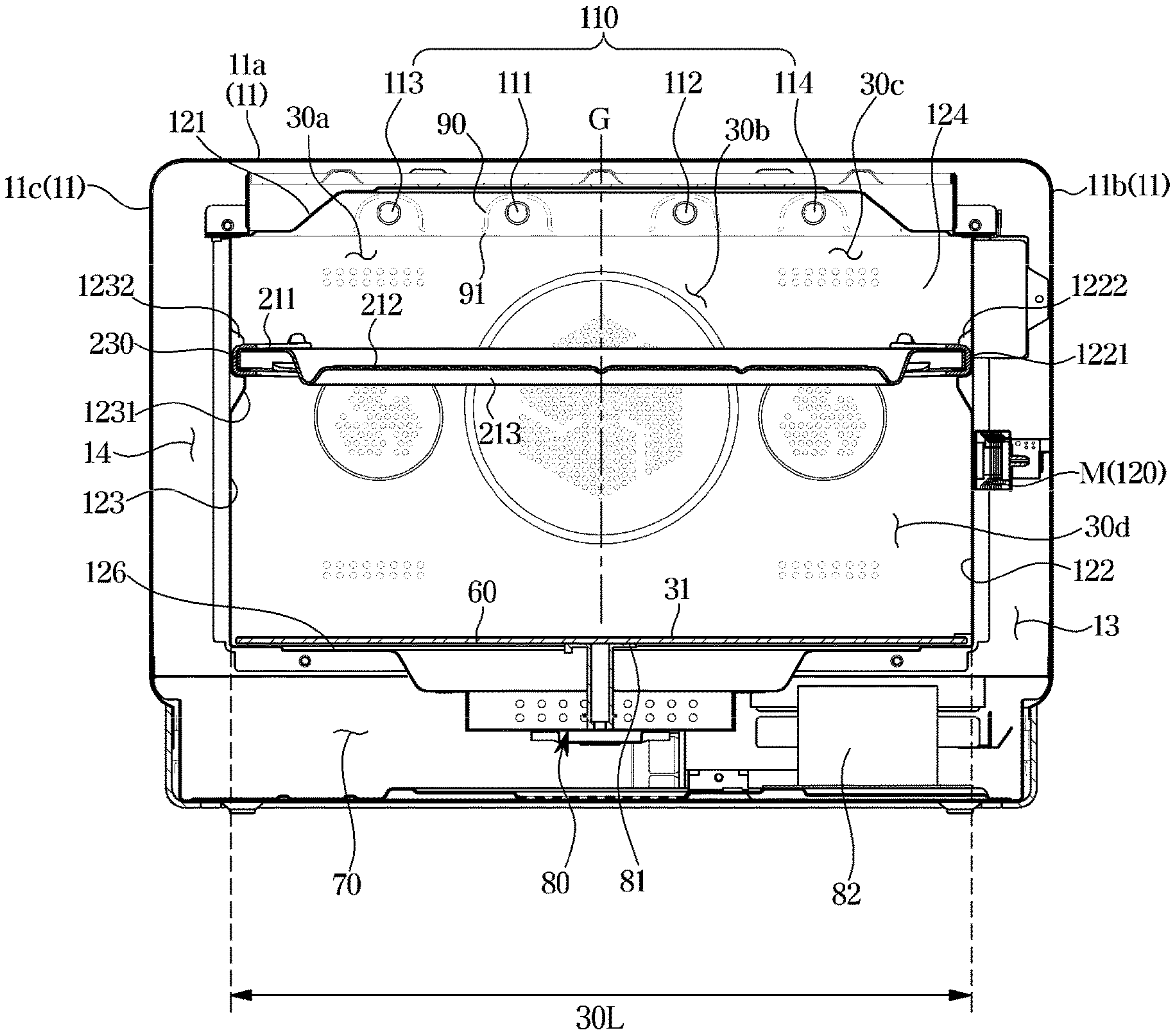
FIG. 3 is a cross-sectional view of a cooking apparatus, according to an embodiment of the disclosure.
Figure 4:
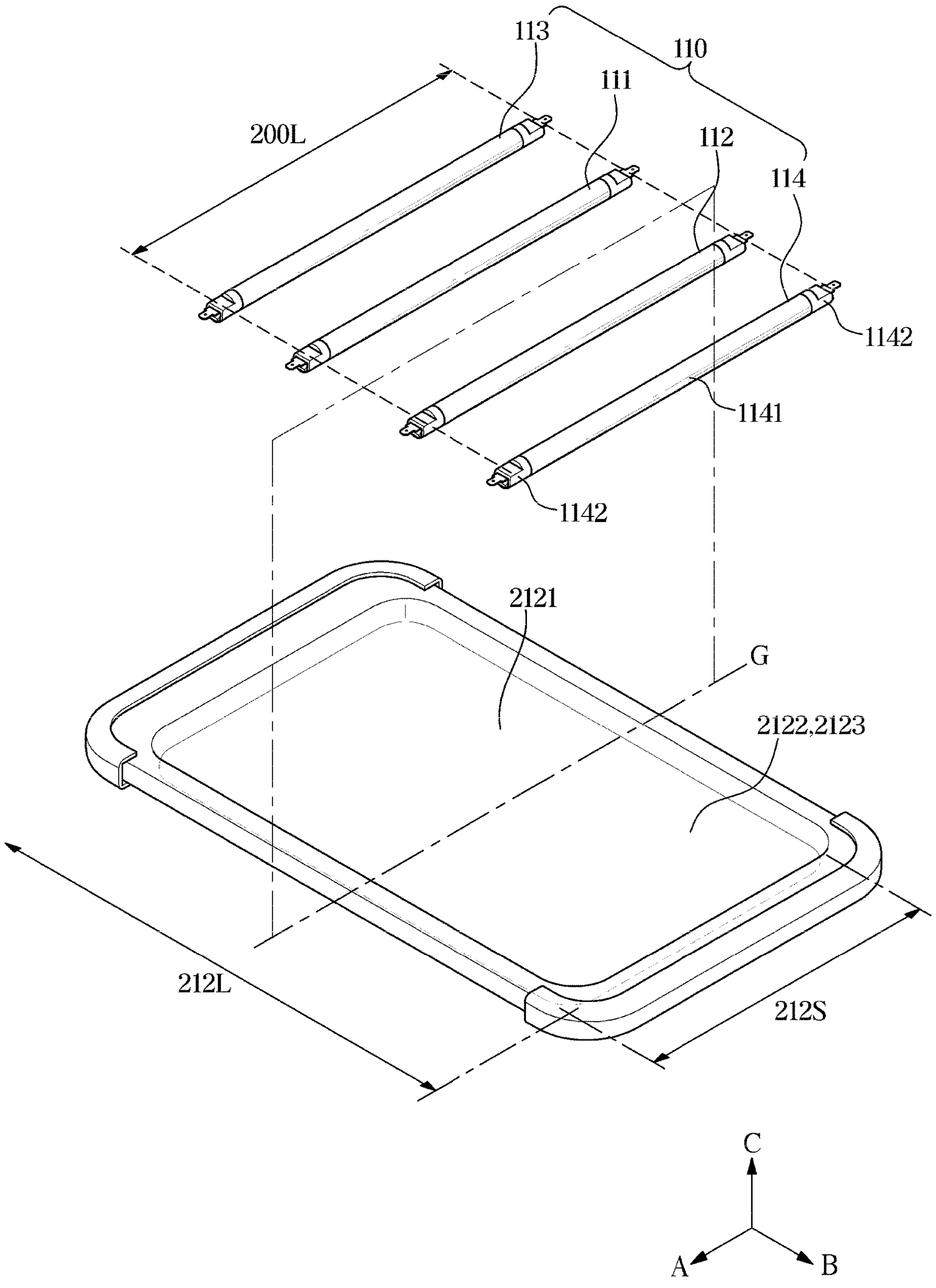
FIG. 4 illustrates a plurality of heaters and a tray in a cooking apparatus, according to an embodiment of the disclosure.

FIG. 1 is a perspective view of a cooking apparatus, according to an embodiment of the disclosure; FIG. 2 illustrates several components in a cooking apparatus, according to an embodiment of the disclosure; FIG. 3 is a cross-sectional view of a cooking apparatus, according to an embodiment of the disclosure; FIG. 4 illustrates a plurality of heaters and a tray in a cooking apparatus, according to an embodiment of the disclosure;

Referring to FIGS. 1 to 4, a cooking apparatus 1 may include an outer housing 11 defining an exterior, and an inner housing 12 arranged inside the outer housing 11 and forming a cooking chamber 30.

The cooking chamber 30 may form a space to have an object to be cooked (hereinafter, cooking object) placed therein.

The outer housing 11 and the inner housing 12 may be formed to be opened to a forward direction A of the cooking apparatus 1. Hereinafter, the forward direction A may be referred to as a first direction A.

The user may put a cooking object into the cooking chamber 30 through the opening of the inner housing 12, which is formed in the first direction A of the cooking apparatus 1.

The cooking chamber 30 may be shaped almost like a rectangular solid having long sides 30L in a left-right direction B, which is perpendicular to the first direction A. The left-right direction B may be referred to as a second direction B.

The cooking apparatus 1 may include a door 20 arranged to open or close the opening of a main body 10.

The door 20 may include an input module 40 through which the user may input a signal to control the cooking apparatus 1.

Although the input module 40 is shown as having the shape of a knob in FIG. 1, the shape of the input module 40 may not be limited thereto. For example, the input module 40 may include a display 50 for displaying an image or a touch part through which to input a signal by touching the image.

The door 20 may include a transparent member 21 provided to allow the user to look inside of the cooking chamber 30 while the door 20 is closed.

The cooking apparatus 1 may include a tray 200 hung in the cooking chamber 30 for the user to place the cooking object thereon.

The tray 200 may be detachably arranged in the cooking chamber 30. The tray 200 may be arranged to be drawn forward from the cooking chamber 30.

The cooking apparatus 1 may include a plurality of tray seats 1221 and 1231 formed on both sides, respectively, of the cooking chamber 30 for the tray 200 to be hung between upper and lower surfaces of the cooking chamber 30.

Specifically, the plurality of tray seats 1221 and 1231 may be formed to protrude toward the cooking chamber 30 from a first side plate 122 and a second side plate 123 of the inner housing 12.

The cooking apparatus 1 may include a plurality of tray supporters 1222 and 1232. The plurality of tray supporters 1222 and 1232 may be formed above the plurality of tray seats 1221 and 1231 to support the tray 200. This will be described later in detail.

The tray 200 may include a plurality of cooking surfaces 2121, 2122 and 2123, on which cooking objects may be placed.

The plurality of cooking surfaces 2121, 2122 and 2123 may be arranged to face the upper surface of the cooking chamber 30 when the tray 200 is hung inside the cooking chamber 30. The plurality of cooking surfaces 2121, 2122 and 2123 may be arranged to face the a plurality of heaters 111, 112, 113 and 114.

The cooking apparatus 1 may include a turn table 60.

A cooking object may be placed on the upper surface of the turn table 60. The upper surface of the turn table 60 may form a bottom surface 31 of the cooking chamber 30. When the turn table 60 is rotated, the cooking object placed on the turn table 60 may be rotated along with the turn table 60. This may allow the cooking object placed on the turn table 60 to uniformly absorb high-frequency waves. This will be described later in detail.

Referring to FIGS. 2 to 4, the cooking apparatus 1 may include a plurality of heating sources 100 for providing heat into the cooking chamber 30 to cook the cooking object by heat.

The plurality of heating sources 100 may be arranged to provide heat to the cooking object placed on the tray 200 to cook the cooking object.

Alternatively, the cooking object may be placed on the bottom surface 31 of the cooking chamber 30 without the tray 200. Even in this case, the plurality of heating sources 100 may provide heat to the cooking object placed on the bottom surface 31 of the cooking chamber 30.

The plurality of heating sources 100 may include a first heating source 110 arranged on the upper surface of the cooking chamber 30.

The plurality of heating sources 100 may include a second heating source 120 arranged outside the cooking chamber 30. More specifically, the second heating source 120 may be arranged outside a side of the cooking chamber 30. The position of the second heating source 120 is not, however, limited thereto, and the second heating source 120 may be arranged underneath the cooking chamber 30. This will be described later in detail.

The first heating source 110 may include the plurality of heaters 111, 112, 113 and 114 for producing radiant heat. The plurality of heaters 111, 112, 113 and 114 may radiate heat produced by the heaters 111, 112, 113 and 114, thereby transferring the heat directly to the cooking object. The plurality of heaters 111, 112, 113 and 114 may be installed on the upper side of the inner housing 12. The plurality of heaters 111, 112, 113 and 114 may be arranged on the upper side of the inner housing 12 to heat the cooking object.

Specifically, the plurality of heaters 111, 112, 113 and 114 may be installed on an upper plate 121 of the inner housing 12.

The second heating source 120 may include a magnetron M.

High-frequency waves produced from the magnetron M may be entered into the cooking object, keep changing molecular arrangement of water contained in the cooking object and thus enabling the inside of the cooking object to be cooked by frictional heat between molecules produced by the changes of molecular arrangement.

The magnetron M may be arranged on a side to the cooking chamber 30. Specifically, the magnetron M may be arranged between the first side plate 122 of the cooking chamber 30 and a first side wall 11*b* of the outer housing 11. On the contrary, the magnetron M may be arranged between the second side plate 123 of the cooking chamber 30 and a second side wall 11*b* of the outer housing 11.

The magnetron M may be arranged outside the cooking chamber 30 at a lower height than the tray 200 so as to emit high-frequency waves to an area between the tray 200 and the turn table 60. This will be described later in detail.

As described above, the cooking apparatus 1 according to the embodiment of the disclosure, which includes the first heating source 110 and the second heating source 120, may efficiently cook a single cooking object or separately cook a plurality of cooking objects at the same time.

The tray 200 may be arranged to divide the inside of the cooking chamber 30.

Specifically, the tray 200 may partition the inside of the cooking chamber 30 in vertical direction C into first to third cooking sections 30*a*, 30*b* and 30*c* formed above the tray 200 and a fourth cooking section 30*d* formed under the tray 200. Hereinafter, the vertical direction C may be referred to as a third direction C.

In other words, the tray 200 may include the plurality of cooking sections 30*a*, 30*b*, 30*c* and 30*d* on which to place cooking objects and to which heats with different temperatures are transferred by the plurality of heaters 111, 112, 113 and 114.

The first to third cooking sections 30*a*, 30*b* and 30*c* may be arranged to place an object therein to be cooked by the first and second heating sources 110 and 120.

Specifically, the cooking object placed in the first to third cooking sections 30*a*, 30*b* and 30*c* may be cooked by heat produced by the plurality of heaters 111, 112, 113 and 114 and a heating portion 213 of the tray 200, which will be described later.

The fourth cooking section 30*d* may be provided to place an object therein to be cooked by the second heating source 120. The cooking object placed in the fourth cooking section 30*d* may be cooked by high-frequency waves produced by the second heating source 120.

As the inside of the cooking chamber 30 is partitioned by the tray 200, it is possible to place and simultaneously cook a plurality of objects required to be cooked in different cooking methods in the cooking chamber 30.

Specifically, even when an object to be cooked by radiant heat is placed in the first to third cooking sections 30*a*, 30*b* and 30*c* and an object to be cooked by high-frequency waves is placed in the fourth cooking section 30*d*, the respective cooking objects may be cooked simultaneously by activating the first heating source 110 and the second heating source 120.

Accordingly, it is possible to simultaneously cook objects to be cooked in different cooking methods in the same cooking chamber 30, thereby increasing convenience of the user.

As will be described later, the entire area of the tray 200 may correspond to an area of the cooking chamber 30. Accordingly, the heat produced by the first heating source 110 may be partially prevented from being transferred from the first to third cooking sections 30*a*, 30*b* and 30*c* to the fourth cooking section 30*d*.

Furthermore, the high-frequency waves oscillating in the fourth cooking section 30*d* may be partially prevented from being transferred from the fourth cooking section 30*d* to the first to third cooking sections 30*a*, 30*b* and 30*c*.

Hence, cooking in the first to third cooking sections 30*a*, 30*b* and 30*c*, and the fourth cooking section 30*d* may be conducted separately.

When the plurality of heaters 111, 112, 113 and 114 are arranged on the upper surface of the cooking chamber 30 as in the embodiment of the disclosure, sections may be formed at positions corresponding the respective heaters in the third direction C to have temperatures corresponding to heats produced from the respective heaters.

Specifically, the sections to receive different temperatures may be separately formed over the plurality of cooking surfaces 2121, 2122, and 2123 of the tray 200.

That is, the plurality of cooking sections 30*a*, 30*b*, 30*c* and 30*d* may be formed in the third direction C at positions corresponding to the respective heaters on the plurality of cooking surfaces 2121, 2122, and 2123. The respective cooking sections may be arranged to directly receive heat produced from the respective heaters.

Hence, when a plurality of objects to be cooked at different temperatures are placed in the cooking chamber 30 at the same time and arranged in the plurality of cooking sections 30*a*, 30*b*, and 30*c* on the plurality of cooking surfaces 2121, 2122, and 2123 partitioned off by the difference in temperature, the cooking objects may be cooked at different cooking temperatures.

That is, the cooking objects placed in the different sections may be cooked at different temperatures.

The cooking chamber 30 may be shaped like a rectangular solid with the long sides 30L running in the second direction B, and the tray 200 matching the cooking chamber 30 may also include a rectangular cooking surface having the long sides 30L in the second direction and short sides in the first direction A.

The plurality of heaters 111, 112, 113 and 114 may be provided to have a long axis 71L running in the first direction A, and may be arranged at certain intervals in the second direction B, which corresponds to a direction of the long side 30L of the cooking chamber 30.

Accordingly, the plurality of cooking sections 30*a*, 30*b*, 30*c* and 30*d* may be partitioned off along the second direction B to receive heat of different temperatures over the plurality of cooking surfaces 2121, 2122, and 2123.

The plurality of heaters 111, 112, 113 and 114 and the plurality of cooking sections 30*a*, 30*b*, 30*c*, and 30*d* separated by the tray 200 to correspond to the heaters 111, 112, 113 and 114 in an embodiment of the disclosure will now be described in detail.

The plurality of heaters 111, 112, 113 and 114 may include four heaters: the first heater 111, the second heater 112, the third heater 113, and the fourth heater 114. The number of the heaters are not, however, limited thereto. For example, the heaters may include only the first and second heaters 111 and 112 or may include more than 4 heaters.

The first heater 111 may be arranged on one side in the second direction B and the second heater 112 may be arranged on the other side in the second direction B.

Specifically, with respect to a center line G of the tray 200, the first heater 111 may be placed on one side of the tray 200 and the second heater 112 may be placed on the other side of the tray 200 in the second direction B.

The third heater 113 may be arranged to be adjacent to the first heater 111 on the one side of the tray 200, and the fourth heater 114 may be arranged to be adjacent to the second heater 112 on the other side of the tray 200. The third heater 113 may be arranged further outside than the first heater 111, and the fourth heater 114 may be arranged further outside than the second heater 112.

The first and third heaters 111 and 113 may produce heat of the same temperature. Furthermore, the second and fourth heaters 112 and 114 may produce heat of the same temperature.

The first and third heaters 111 and 113, and the second and fourth heaters 112 and 114 may be provided to transfer different temperatures of heat to the tray 200. Specifically, a temperature transferred to the tray 200 from a side of the center line G may be set to be different from a temperature transferred to the tray 200 from the other side of the center line G.

The temperatures themselves of the heat produced by the plurality of heaters 111, 112, 113 and 114 may all be the same. While in operation, the cooking apparatus 1 may control the plurality of heaters 111, 112, 113 and 114 by constantly driving the first and third heaters 111 and 113 and repeatedly turning on and off the second and fourth heaters 112 and 114.

On the contrary, the cooking apparatus 1 may control the plurality of heaters 111, 112, 113 and 114 by repeatedly turning on and off the first and third heaters 111 and 113 and constantly driving the second and fourth heaters 112 and 114.

Accordingly, a total temperature of heat produced by the first and second heaters 111 and 113 for a period of time may be different from a total temperature of heat produced by the second and fourth heaters 112 and 114 for the same period of time.

It is not, however, limited thereto, and the plurality of heaters 111, 112, 113 and 114 may be configured such that temperatures themselves of heat produced by the first and second heaters 111 and 113 and the second and fourth heaters 112 and 114 may be different.

In an embodiment of the disclosure, the plurality of heaters 111, 112, 113 and 114 of the cooking apparatus 1 may be arranged at certain intervals in the second direction B. Hence, the first to third cooking surfaces 2121, 2122 and 2123 of the tray 200 may be partitioned off in the second direction B.

The first to third cooking sections 30*a*, 30*b* and 30*c* may be separated by the first and third heaters 111 and 113 and the second and fourth heaters 112 and 114 to have different cooking temperatures in the second direction B, which is a left-right direction.

Specifically, the first cooking section 30*a* may be provided to correspond to the first and third heaters 111 and 113, and the second and third cooking sections 30*b* and 30*c* may be provided to correspond to the second and fourth heaters 112 and The first cooking section 30*a* may be provided to correspond to the first cooking surface 2121 of the tray 200, the second cooking section 30*b* may be provided to correspond to the second cooking surface 2122 of the tray 200, and the third cooking section 30*c* may be provided to correspond to the third cooking surface 2123 of the tray 200.

Accordingly, a plurality of different cooking objects may be simultaneously cooked in the first to third cooking sections 30*a*, 30*b* and 30*c*.

Furthermore, a cooking object in the fourth cooking section 30*d* may also be cooked at the same time.

An object to be cooked in the first cooking section 30*a*, referred to as a first cooking object, an object to be cooked in the second cooking section 30*b*, referred to as a second cooking object, an object to be cooked in the third cooking section 30*c*, referred to as a third cooking object, and an object to be cooked in the fourth cooking section 30*d*, referred to as a fourth cooking object, may be cooked at different external temperatures and high-frequency waves.

That is, cooking objects having different cooking methods or different cooking temperatures may be simultaneously cooked in the single cooking chamber 30.

It is not, however, limited thereto, and more or fewer cooking objects having different cooking methods or different cooking temperatures may be simultaneously cooked.

The tray 200 may be arranged to be at a certain distance from the first heating source 110 in the vertical direction, which is the third direction C. To make a difference in temperature between the plurality of cooking surfaces 2121, 2122 and 2123 of the tray 200 by more than a certain range, a distance between the tray 200 and the first heating source 110 may be adjusted. This will be described later in detail.

The cooking apparatus 1 may include reflective members 90 provided to transfer heat produced by the first and third heaters 111 and 113 into the first cooking section 30*a* and transfer heat produced by the second and fourth heaters 112 and 114 into the second and third cooking sections 30*b* and 30*c* with the least loss.

The reflective members 90 may be arranged over the plurality of heaters 111, 112, 113 and 114 in the third direction C. The reflective members 90 may each have the form of covering an upper portion of each heater in the third direction C.

Accordingly, heat produced by the plurality of heaters 111, 112, 113 and 114 may be concentrated on the plurality of cooking surfaces 2121, 2122 and 2123 under the plurality of heaters 111, 112, 113 and 114.

A protection member 91 may be arranged underneath the plurality of heaters 111, 112, 113 and 114. The protection member 91 may be provided to prevent the cooking object from splattering to the plurality of heaters 111, 112, 113 and 114 while cooking. The protection member 91 may include a plurality of holes to transfer the heat produced from the plurality of heaters 111, 112, 113 and 114 entirely to the cooking chamber 30.

The cooking apparatus 1 may include the turn table 60 and a turn table driver 80 to rotate the turn table 60.

The turn table 60 may form the bottom surface 31 of the cooking apparatus 1. The turn table 60 may be rotatably mounted on a bottom plate 126 of the inner housing 12.

The turn table driver 80 may include a driving shaft 81 for delivering rotational force to the turn table 60, and a driving motor 82 for generating power.

The turn table driver 80 may be arranged in a machine room 70 of the cooking apparatus 1. The machine room 70 may be formed between the bottom plate 126 of the inner housing 12 and the outer housing 11. The position of the turn table driver 80 is not, however, limited thereto.

The plurality of seats 1221 and 1231 may include the first tray seat 1221 and the second tray seat 1231.

The first tray seat 1221 may be formed to protrude toward the cooking chamber 30 from the first side plate 122 of the inner housing 12. The second tray seat 1231 may be formed to protrude toward the cooking chamber 30 from the second side plate 123 of the inner housing 12.

The first tray seat 1221 and the second tray seat 1231 may be formed by being sunken inward from the outside of the inner housing 12. However, how the plurality of tray seats 1221 and 1231 are formed is not limited thereto.

The cooking apparatus 1 may include the plurality of tray supporters 1222 and 1232 arranged above the plurality of tray seats 1221 and 1231, respectively. The plurality of tray supporters 1222 and 1232 may be formed to prevent the tray 200 seated on the plurality of tray seats 1221 and 1231 from being moved upward.

The plurality of supporters 1222 and 1232 may include the first tray supporter 1222 and the second tray supporter 1232.

The first tray supporter 1222 may be arranged above the first tray seat 1221. The first tray supporter 1222 may be formed to protrude toward the cooking chamber 30 from the first side plate 122 of the inner housing 12. The first tray supporter 1222 may be formed by being sunken inward from the outside of the first side plate 122.

The second tray supporter 1232 may be arranged above the second tray seat 1231. The second tray supporter 1232 may be formed to protrude toward the cooking chamber 30 from the second side plate 123 of the inner housing 12. The second tray supporter 1232 may be formed by being sunken inward from the outside of the second side plate 123.

Both ends of the tray 200 are supported between the plurality of tray seats 1221 and 1231 and the plurality of tray supporters 1222 and 1232, so that the tray 200 may be fixedly arranged in the cooking chamber 30. Details of the tray 200 will now be described.

Figure 5:
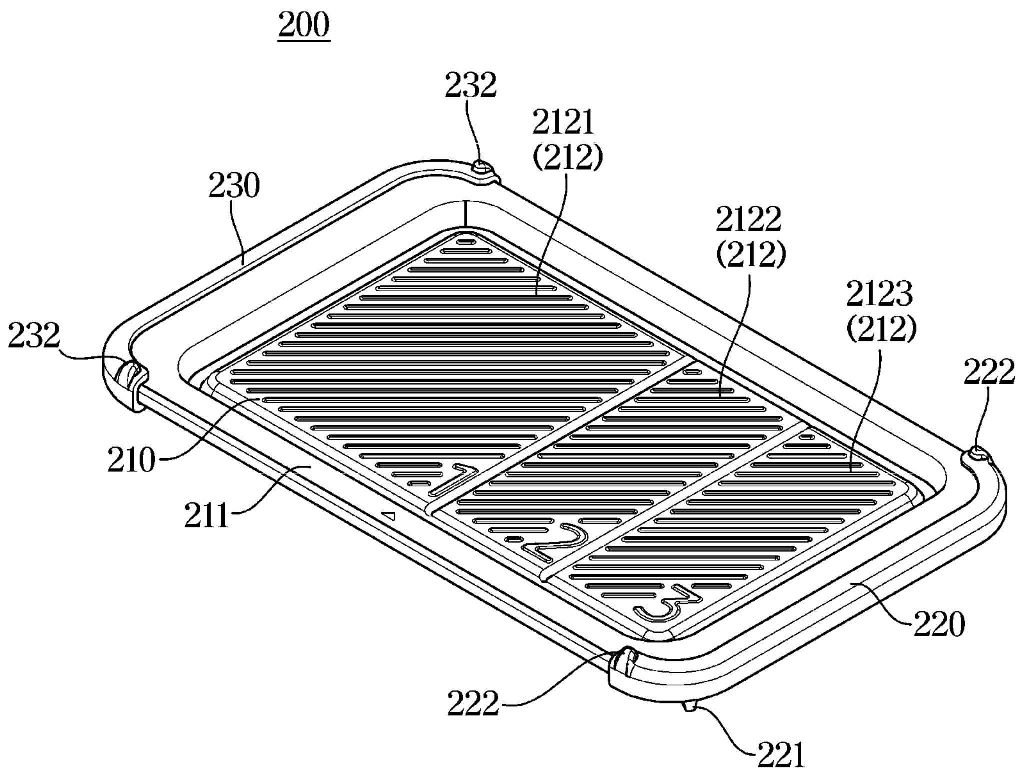
FIG. 5 is a perspective view of a tray in a cooking apparatus, according to an embodiment of the disclosure.
Figure 6:
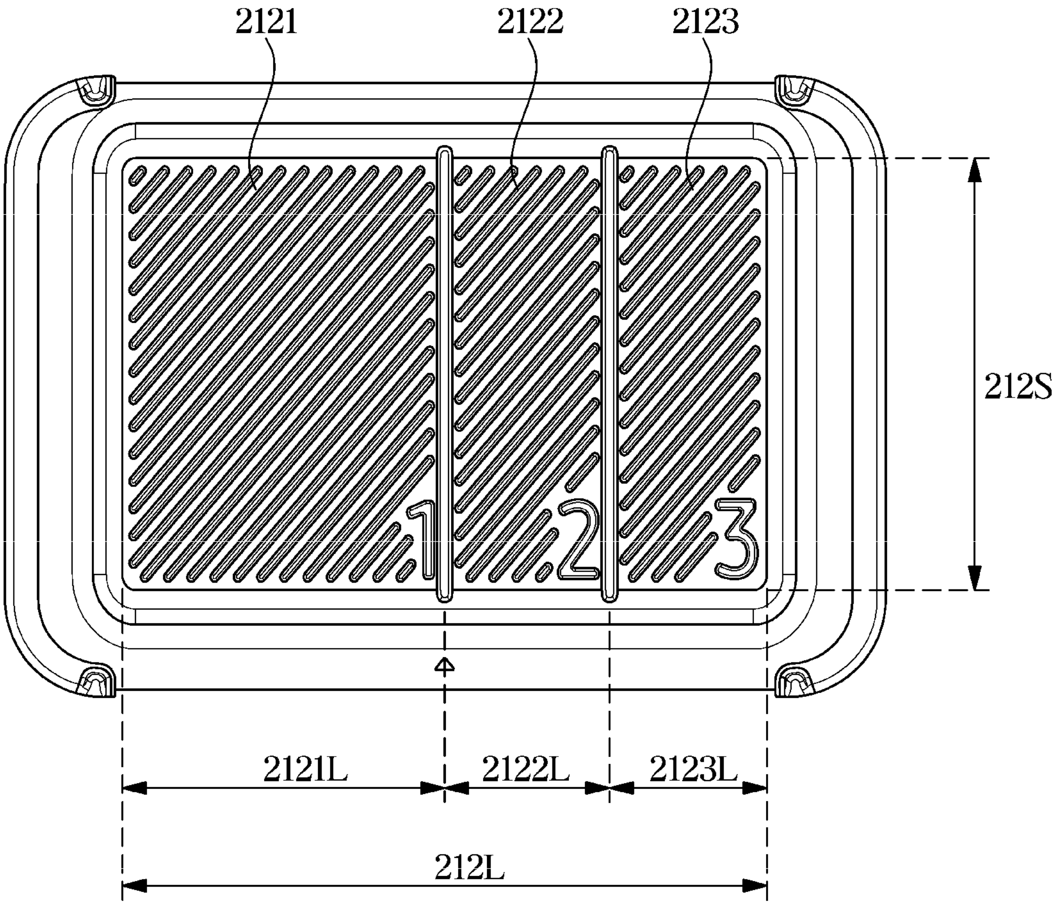
FIG. 6 is a top view of the tray shown in FIG. 5.
Figure 7:
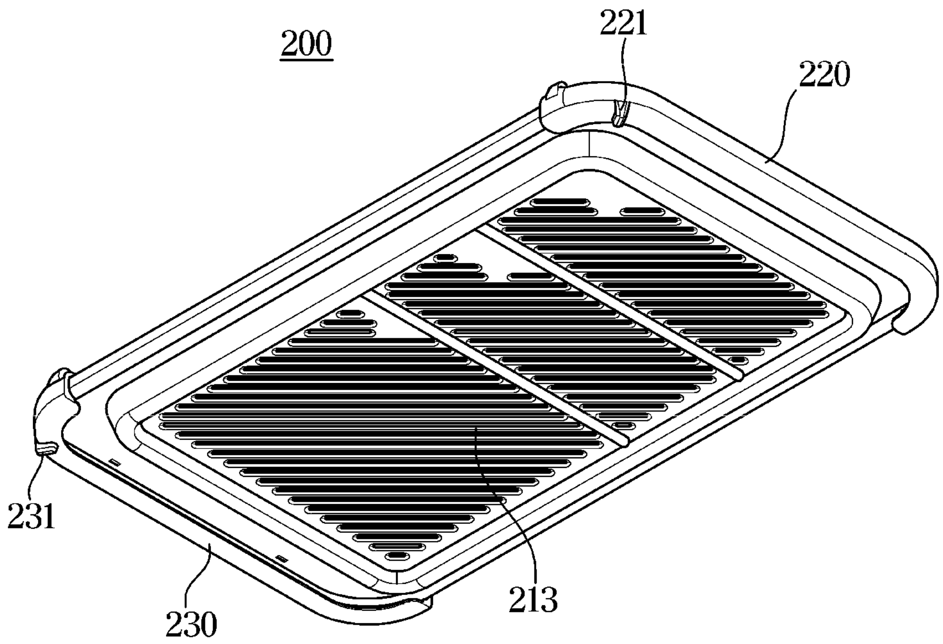
FIG. 7 is a bottom view of the tray shown in FIG. 5.

FIG. 5 is a perspective view of a tray in a cooking apparatus, according to an embodiment of the disclosure. FIG. 6 is a top view of the tray shown in FIG. 5. FIG. 7 is a bottom view of the tray shown in FIG. 5.

Referring to FIGS. 5 to 7, the tray 200 may include a plate 210 on which cooking is performed, and a plurality of tray holders 220 and 230 for supporting both sides of the plate 210.

The plate 210 may include an edge portion 211 and a cooking portion 212.

The cooking portion 212 may include the plurality of cooking surfaces 2121, 2122 and 2123, on which cooking on the cooking object may be performed.

The edge portion 211 may be formed on the boundary with the cooking portion 212. The cooking portion 212 may be stepped down from the inner side of the edge portion 211 by a certain depth. This may prevent the cooking object from overflowing outside or getting out of the tray 200 when the cooking object is placed in the cooking portion 212.

The cooking portion 212 of the plate 210 may include the plurality of cooking surfaces 2121, 2122 and 2123.

The plurality of cooking surfaces 2121, 2122 and 2123 may include the first to third cooking surfaces 2121, 2122 and 2123.

The first cooking surface 2121 may be arranged in a position corresponding to the first cooking section 30*a*. The second cooking surface 2122 may be arranged in a position corresponding to the second cooking section 30*b* and the third cooking surface 2123 may be arranged in a position corresponding to the third cooking section 30*c*.

With respect to the center line G (see FIG. 3), the first cooking surface 2121 may be formed on one side of the tray 200 and the second and third cooking surfaces 2122 and 2123 may be formed on the other side.

The first cooking surface 2121 may be arranged in a position corresponding to the first and third heaters 111 and 113 in the third direction C. The second and third cooking surfaces 2122 and 2123 may be arranged in positions corresponding to the second and fourth heaters 112 and 114, respectively, in the third direction C.

The heat transferred from the first and third heaters 111 and 113 is different from the heat transferred from the second and fourth heaters 112 and 114, so the first, second and third cooking surfaces 2121, 2122 and 2123 may receive different temperatures of heat.

Accordingly, it is possible for different cooking objects that need to be cooked at different cooking temperatures to be placed on the first, second and third cooking surfaces 2121, 2122 and 2123 and cooked simultaneously.

Furthermore, the user may easily observe cooking processes on the different cooking objects in real time through the transparent member 21 while the cooking apparatus 1 is operating.

The plate 210 may include the heating portion 213.

The heating portion 213 may be formed on the undersurface of the plate 210. High-frequency waves produced from the magnetron M may be absorbed to the tray 200 through the heating portion 213, thereby heating the lower side of the cooking object placed on the cooking portion 212.

The tray holders may include the first tray holder 220 and the second tray holder 230.

The first tray holder 220 may be mounted on one side of the plate 210. The second tray holder 230 may be mounted on the other side of the plate 210.

The first tray holder 220 and the second tray holder 230 may be provided to contact the first tray seat 1221 and the second tray seat 1231, respectively.

As the first tray holder 220 and the second tray holder 230 support both sides of the plate 210, the plate 210 may be fixedly arranged in the cooking chamber 30.

The first tray holder 220 may include a first interference member 221 formed in the front.

Specifically, the first interference member 221 may be provided to protrude downward from the undersurface of the first tray holder 220. The first interference member 221 may be arranged not to interfere with the first tray seat 1221. The first interference member 221 may be arranged to cover a portion of the front of the first tray seat 1221.

The first interference member 221 may be provided in the shape of a projection and arranged to interfere with the second tray seat 1231.

The second tray holder 230 may include a second interference member 231 formed in the front. The first and second tray holders 220 and 230 are arranged to be symmetrical to each other, so the first and second interference members 221 and 231 may be arranged at positions symmetrical to each other with respect to the center line G.

The second interference member 231 may be arranged not to interfere with the second tray seat 1231. The second interference member 231 may be arranged to cover a portion of the front of the second tray seat 1231.

The second interference member 231 may be provided in the shape of a projection and arranged to interfere with the first tray seat 1221.

The tray 200 may be inserted to the cooking chamber 30 such that the rear side of the tray 200 opposite from the front side on which the first interference member 221 is formed faces the cooking chamber 30. This may be called forward insertion of the tray 200.

However, the user may sometimes insert the tray 200, by mistake, with the front side of the tray 200 on which the first interference member 221 is formed facing the cooking chamber 30 This may be called backward insertion of the tray 200.

In the case of the backward insertion of the tray 200, the first interference member 221 formed on the undersurface of the front of the tray 200 interferes with the first tray seat 1221 of the inner housing 12, which protrudes to the inside of the cooking chamber 30, thereby preventing misinsertion of the tray 200.

The second interference member 231 also serves the same role as the first interference member 221, so the description thereof will be omitted.

In an embodiment of the disclosure, as the tray 200 of the cooking apparatus 1 includes the plurality of cooking surfaces 2121, 2122 and 2123 heated at different temperatures, when the tray 200 is misinserted from the wrong side in the left-right direction, the plurality of heaters 111, 112, 113 and 114 mismatches the plurality of corresponding cooking surfaces 2121, 2122 and 2123, leading to a failure to perform cooking that the user wants.

Hence, there is a need to prevent misinsertion of the tray 200 in the left-right direction, and the need may be satisfied by preventing misinsertion of the tray 200 with the plurality of interference members formed on the front side of the tray 200.

The first tray holder 220 may include a plurality of first separation members 222.

The plurality of first separation members 222 may be formed at the front and back portions of the first tray holder 220, respectively. The plurality of first separation members 222 may be formed to extend upward from the upper surface of the first tray holder 220.

The second tray holder 230 may include a plurality of second separation members 232.

The plurality of second separation members 232 may be formed at the front and back portions of the second tray holder 230, respectively. The plurality of second separation members 232 may be formed to extend upward from the upper surface of the second tray holder 230.

However, the number of the plurality of separation members is not limited thereto.

The plurality of first separation members 222 and the plurality of second separation members 232 may make a gap between the bottom surface 31 in the cooking chamber 30 and the cooking surface of the tray 200 when the tray 200 is placed upside down on the bottom surface 31.

With the first separation members 222 and the second separation members 232 formed on the tray 200, the upper surface of the tray 200 and the bottom surface 31 of the cooking chamber 30 may keep a certain distance even when the tray 200 is placed upside down on the bottom surface 31.

This may prevent safety accidents because the high-frequency waves are not stuck in between the tray 200 and the bottom surface 31 of the cooking chamber 30 but may get outside.

Referring to FIG. 6, the tray 200 of the cooking apparatus 1 according to an embodiment of the disclosure may include a cooking portion 212 in which the plurality of cooking surfaces 2121, 2122 and 2123 are formed.

The cooking portion 212 may have cooking portion long sides 212L extending in the left-right direction of the tray 200 and cooking portion short sides 212S extending in the front-back direction of the tray 200.

The first to third cooking surfaces 2121, 2122 and 2123 may be separated in the left-right direction of the tray 200.

A sum of width 2121L of the first cooking surface 2121, width 2122L of the second cooking surface 2122 and width 2123L of the third cooking surface 2123 in the left-right direction of the tray 200 may be equal to the length of the cooking portion long side 212L.

Furthermore, width of each of the first to third cooking surfaces 2121, 2122 and 2123 in the up-down direction of the tray 200 may be equal to the length of the cooking portion short side 212S.

In this case, the cooking portion long side 212L may be about 1.4 or more and about 2.0 or less times the length of the cooking portion short side 212S. In other words, the length in the left-right direction of the cooking portion 212 may be set to about 1.4 or more and about 2.0 or less times the length of the front-back direction of the cooking portion 212, which is perpendicular to the length in the left-right direction.

Accordingly, the cooking portion 212 of the tray 200 may be more efficiently partitioned off, thereby enabling various cooking objects to be cooked.

Figure 8:
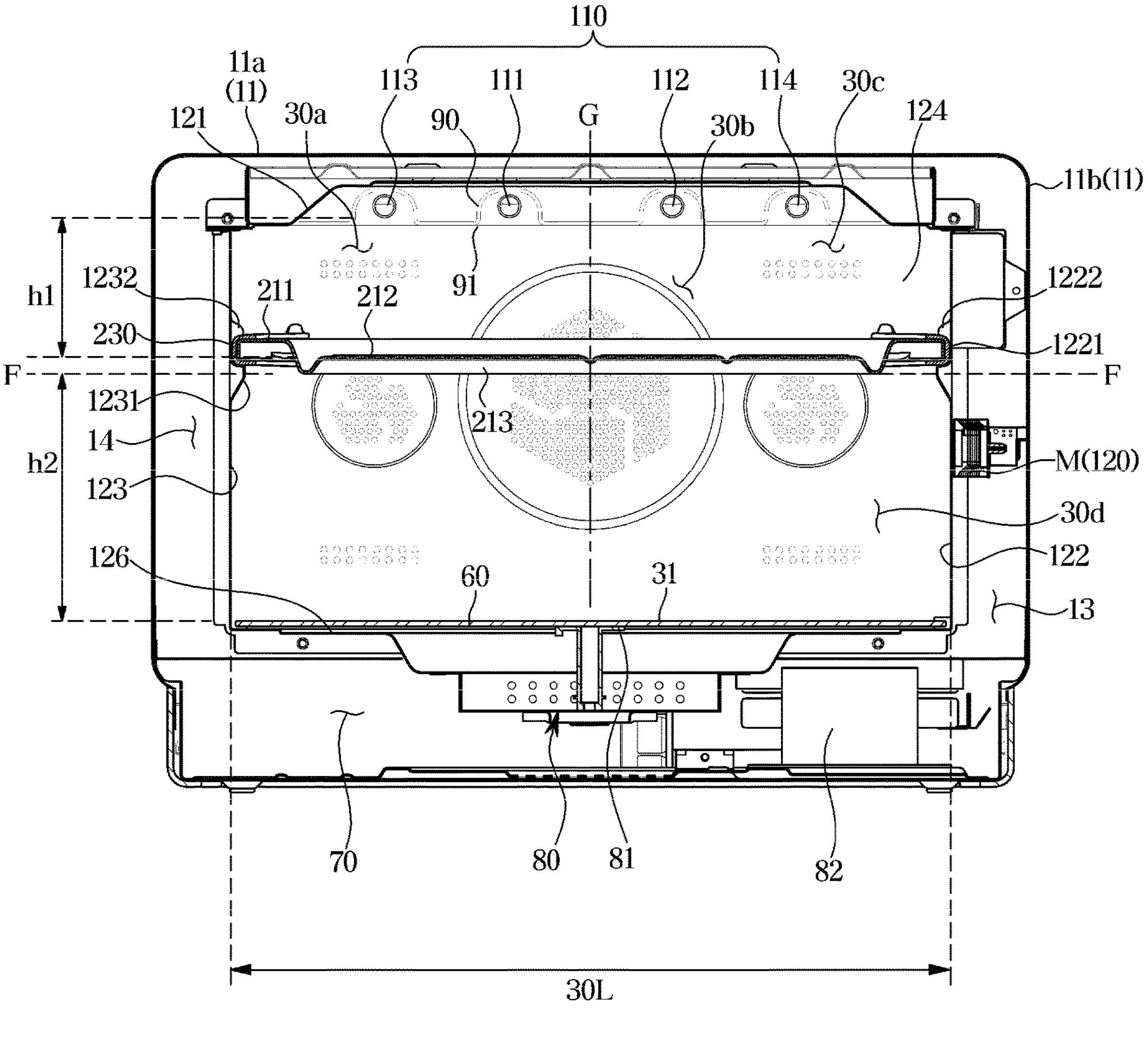
FIG. 8 illustrates distances between a tray, a plurality of heaters, and a turn table in a cooking apparatus of FIG. 3.

FIG. 8 illustrates distances between the tray, the plurality of heaters, and the turn table in the cooking apparatus of FIG. 3.

In an embodiment of the disclosure, the outer housing 11 of the cooking apparatus 1 may include an upper wall 11*a*, the first side wall 11*b* and a second side wall 11*c*. Although not shown, the outer housing 11 may include a rear wall.

The inner housing 12 of the cooking apparatus 1 may include the upper plate 121, the first side plate 122, the second side plate 123, the bottom plate 126, and the rear plate 124. Furthermore, as shown in FIG. 2, the inner housing 12 may include a front plate 125. The plurality of heaters 111, 112, 113 and 114 may be mounted on the upper plate 121 of the inner housing 12. The upper plate 121 of the inner housing 12 may be formed to bend upward so as to form a space to contain the plurality of heaters 111, 112, 113 and 114.

The first side wall 11*b* may be arranged side by side with the outer side of the first side plate 122. The second side wall 11*c* may be arranged side by side with the outer side of the second side plate 123. The upper wall 11*a* may be arranged side by side with the outer side of the upper plate 121.

The first side plate 122 of the inner housing 12 may form a side surface of the cooking chamber 30. The second side plate 123 of the inner housing 12 may form the other side surface of the cooking chamber 30. The first and second side plates 122 and 123 may be arranged to face each other.

The upper plate 121 may be arranged on the top side of the cooking chamber 30 between the first and second side plates 122 and 123.

Hence, the plurality of heaters 111, 112, 113 and 114 may be arranged to be separated from each other in a direction from the first side plate 122 toward the second side plate 123. In other words, the first to fourth heaters 111, 112, 113 and 114 may be arranged to be separated from each other in a direction from the first side plate 122 toward the second side plate 123.

The second heating source 120 including the magnetron M may be arranged outside the cooking chamber 30 at a lower height than the tray 200 so as to emit high-frequency waves to an area between the tray 200 and the turn table 60. Furthermore, the magnetron M may be arranged at lower height than the tray seats 1221 and 1231 formed on the inner housing 12.

Specifically, the magnetron M may be arranged in a space between the first side plate 122 of the inner housing 12 and the first side wall 11*b* of the outer housing 11. The space between the first side plate 122 and the first side wall 11*b* is a first space 13.

The position of the magnetron M is not limited thereto, but the magnetron M may be arranged in a space between the second side plate 123 of the inner housing 12 and the second side wall 11*c* of the outer housing 11. The space between the second side plate 123 and the second side wall 11*c* is a second space 14.

As such, the magnetron M may be arranged in the first space 13 or the second space 14 at a lower height than the tray 200.

The magnetron M may be arranged to heat a cooking object placed on the turn table 60. The magnetron M may be arranged to heat a cooking object placed on the tray 200 at the same time. In other words, the magnetron M may heat a first cooking object placed on the tray 200 while heating a second cooking object placed on the turn table 60. In this case, a method of heating the first cooking object may be heating with radiant heat, and a method of heating the second cooking object may be heating with high-frequency waves.

The first heating source 110 including the plurality of heaters 111, 112, 113 and 114 is arranged on the upper surface of the cooking chamber 30, so the radiant heat may be efficiently transferred to an upper portion of the cooking object placed on the cooking portion 212 but hardly transferred to a lower portion of the cooking object. In this case, the heating portion 213 of the tray 200 may transfer, to the cooking portion 212, heat generated by absorbing high-frequency waves oscillating from the magnetron M arranged under the tray 200.

Accordingly, with the magnetron M arranged at a lower height than the tray 200, the heating portion 213 of the tray 200 is able to absorb the high-frequency waves oscillating from the magnetron M more efficiently, thereby effectively heating a lower portion of the cooking object placed on the upper surface of the tray 200. Hence, the magnetron M may be arranged at a lower height than height F of the lower surface of the tray 200.

That is, performance of the cooking apparatus 1 for cooking the cooking object for the same period of time may be further improved.

A distance h1 from the plurality of cooking surfaces 2121, 2122 and 2123 of the tray 200 to the lower surface of the plurality of heaters 111, 112, 113 and 114 may be set to about 100 mm or less. It is desirable that the distance h1 from the plurality of cooking surfaces 2121, 2122 and 2123 of the tray 200 to the lower surface of the plurality of heaters 111, 112, 113 and 114 may be set to about 85 mm.

The distance h1 between the tray 200 and the plurality of heaters 111, 112, 113 and 114 has the biggest influence to temperature distribution on the plurality of cooking surfaces 2121, 2122 and 2123 of the tray 200.

The larger the distance h1 between the tray 200 and the plurality of heaters 111, 112, 113 and 114, the smaller the difference in temperature between the plurality of cooking surfaces 2121, 2122 and 2123.

In an embodiment of the disclosure, the distance between the tray 200 and the plurality of heaters 111, 112, 113 and 114 is designed to attain 30% or more of the difference in temperature between the plurality of cooking surfaces 2121, 2122 and 2123.

When the distance h1 between the tray 200 and the plurality of heaters 111, 112, 113 and 114 becomes too large, the difference in temperature between the plurality of cooking surfaces 2121, 2122 and 2123 may not be secured properly. In this case, even though the respective cooking objects are placed and cooked on the plurality of cooking surfaces 2121, 2122 and 2123, the cooking objects required to be cooked at different temperatures may not be perfectly cooked.

Hence, by setting the distance h1 from the plurality of cooking surfaces 2121, 2122 and 2123 of the tray 200 to the lower surface of the plurality of heaters 111, 112, 113 and 114 to be about 100 mm or less, proper differences in temperature between the plurality of cooking surfaces 2121, 2122 and 2123 may be made.

In this case, outputs of the plurality of heaters 111, 112, 113 and 114 may be set to about 230V/400 W to have maximum consumption power.

A distance h2 from the undersurface of the tray 200 to the upper surface of the turn table 60 may be set to about 90 mm or more and about 130 mm or less.

Various cooking objects to be heated by high-frequency waves may be placed on the turn table 60. For example, a mug containing a liquid may be placed on the turn table 60.

The distance h2 between the undersurface of the tray 200 and the upper surface of the turn table 60 is designed by taking into account the height of such a mug, for example. Accordingly, the user may easily place containers of various shapes with which cooking is performed through high-frequency waves.

Although the magnetron M is shown in FIG. 8 as being arranged between the tray 200 and the turn table 60, the position of the magnetron M is not limited thereto. For example, the magnetron M may be arranged under the turn table 60. In other words, the magnetron M may be arranged in the machine room 70 formed between the bottom plate 126 of the inner housing 12 and the outer housing 11.

As such, the magnetron M may be formed at any position that allows the heating portion 213 formed on the undersurface of the tray 200 to absorb the high-frequency waves.

Several embodiments of the disclosure have been described above, but a person of ordinary skill in the art will understand and appreciate that various modifications can be made without departing from the scope of the disclosure. Thus, it will be apparent to those or ordinary skill in the art that the true scope of technical protection is only defined by the following claims.

What is claimed is:

1. A cooking apparatus comprising:
- an outer housing forming an exterior of the cooking apparatus;
- an inner housing in an interior of the outer housing and forming a cooking chamber;
- a plurality of heaters on an upper side of the cooking chamber;
- a tray that is attachable to and detachable from the cooking chamber, the tray having an upper surface including at least one partition that partitions the tray into sections forming a plurality of cooking surfaces, wherein, when the tray is attached to the cooking chamber, positions of the plurality of cooking surfaces correspond to positions of the plurality of heaters such that the plurality of cooking surfaces are heatable by the plurality of heaters at different temperatures to cook food on the plurality of cooking surfaces;
- a turn table that is rotatable and that, when the tray is attached to the cooking chamber is under the tray; and
- a magnetron to, with the tray attached to the cooking chamber, emit waves capable of cooking food to an area between the tray and the turn table, the magnetron arranged on an exterior of the cooking chamber and positioned at a lower height along a vertical direction than the plurality of heaters and the tray when the tray is attached to cooking chamber.

2. The cooking apparatus of claim 1, wherein
- the inner housing comprises a side plate forming a side surface of the cooking chamber,
- the outer housing comprises a side wall arranged side by side with an outer side of the side plate, and
- the magnetron is arranged in a space between the side plate and the side wall.

3. The cooking apparatus of claim 1, wherein
- the inner housing comprises a tray seat protruding toward the cooking chamber to receive the tray such that the tray is seated on the tray seat, and
- the magnetron is arranged at a lower height along the vertical direction than the tray seat.

4. The cooking apparatus of claim 1, wherein the tray comprises:
- a cooking portion arranged on an upper surface of the tray so as to, when the tray is attached to the cooking chamber, face the plurality of heaters, and
- a heating portion formed on an undersurface of the tray to transfer heat to the cooking portion by absorbing waves capable of cooking food oscillating from the magnetron.

5. The cooking apparatus of claim 4, wherein the magnetron is configured to heat a first object placed on the tray through the heating portion and heat a second object placed on the turn table.

6. The cooking apparatus of claim 1, wherein a distance from the plurality of cooking surfaces of the tray to lower surfaces of the plurality of heaters is set to about 100 mm or less.

7. The cooking apparatus of claim 1, wherein a distance from an undersurface of the tray to an upper surface of the turn table is set to about 90 mm or more and about 130 mm or less.

8. The cooking apparatus of claim 1, wherein a first object is placeable on the tray and a second object is placeable on the turn table, so that the first object and the second object are simultaneously cookable by the plurality of heaters and the magnetron, respectively.

9. The cooking apparatus of claim 1, wherein cooking sections in which cooking is conducted by the plurality of heaters at different temperatures are formed above the tray, and a cooking section in which cooking is conducted by the magnetron is formed under the tray.

10. The cooking apparatus of claim 1, wherein the inner housing comprises:
- a first side plate forming a side surface of the cooking chamber,
- a second side plate opposite the first side plate, and
- an upper plate on an upper side of the cooking chamber between the first side plate and the second side plate and equipped with the plurality of heaters.

11. The cooking apparatus of claim 10, wherein the plurality of heaters comprises a first heater, a second heater, a third heater, and a fourth heater arranged at predetermined intervals along a first direction from the first side plate to the second side plate.

12. The cooking apparatus of claim 11, wherein the plurality of cooking surfaces of the tray comprises:
- a first cooking surface facing the first heater and the third heater,
- a second cooking surface facing the second heater, and
- a third cooking surface facing the fourth heater.

13. The cooking apparatus of claim 12, wherein the tray further comprises a cooking portion formed on the upper surface of the tray to include the first cooking surface, the second cooking surface, and the third cooking surface divided along the first direction, the cooking portion having a length along the first direction and a length along a second direction perpendicular to the first direction, the length along the first direction being about 1.4 or more and about 2.0 or less times the length along the second direction.

14. The cooking apparatus of claim 1, wherein the inner housing comprises a bottom plate equipped with the turn table, and the cooking apparatus further comprising:

a turn table driver in a machine room formed between the bottom plate and the outer housing, and configured to rotate the turn table.

* * * * *